(12) United States Patent
Sellers et al.

(10) Patent No.: US 7,369,061 B1
(45) Date of Patent: May 6, 2008

(54) VEHICLE LOCATOR DEVICE

(76) Inventors: Steven Sellers, 4100 NW. 58th La., Boca Raton, FL (US) 33496-2745; Alexa Sellers, 4100 NW. 58th La., Boca Raton, FL (US) 33496-2745

( * ) Notice: Subject to any disclaimer, the term of this patent is extended or adjusted under 35 U.S.C. 154(b) by 149 days.

(21) Appl. No.: 11/244,513

(22) Filed: Oct. 5, 2005

Related U.S. Application Data

(60) Provisional application No. 60/616,581, filed on Oct. 5, 2004.

(51) Int. Cl.
*B60Q 1/48* (2006.01)

(52) U.S. Cl. ............................... 340/932.2; 340/539.11; 340/539.23; 340/539.32; 340/933; 701/2

(58) Field of Classification Search ............. 340/932.2, 340/593.11, 539.23, 539.32, 933; 701/2
See application file for complete search history.

(56) References Cited

U.S. PATENT DOCUMENTS

| | | | | |
|---|---|---|---|---|
| 5,278,556 | A * | 1/1994 | Oh | 340/988 |
| 5,786,758 | A * | 7/1998 | Bullock | 340/539.32 |
| 5,933,081 | A * | 8/1999 | Jones | 340/539.32 |
| 6,023,218 | A * | 2/2000 | Tremblay | 340/425.5 |
| 6,127,920 | A * | 10/2000 | Chen | 340/425.5 |
| 6,239,701 | B1 * | 5/2001 | Vasquez et al. | 340/539.32 |
| 6,246,314 | B1 * | 6/2001 | Djaid | 340/425.5 |
| 6,304,183 | B1 * | 10/2001 | Causey | 340/572.1 |
| 6,529,142 | B2 * | 3/2003 | Yeh et al. | 340/988 |
| 6,580,368 | B1 * | 6/2003 | Jacobs | 340/539.11 |
| 6,694,258 | B2 * | 2/2004 | Johnson et al. | 701/213 |
| 6,700,479 | B2 * | 3/2004 | Birchfield | 340/426.14 |
| 6,758,160 | B1 * | 7/2004 | Martin | 116/202 |
| 6,774,787 | B1 * | 8/2004 | Melbourne | 340/539.1 |
| 6,828,907 | B1 * | 12/2004 | Galle | 340/539.11 |
| 6,873,257 | B2 * | 3/2005 | Maloney et al. | 340/539.21 |
| 7,142,096 | B2 * | 11/2006 | Eisenman | 340/426.1 |
| 2003/0001728 | A1 * | 1/2003 | Flick | 340/426 |
| 2003/0134600 | A1 * | 7/2003 | Picone et al. | 455/68 |

(Continued)

FOREIGN PATENT DOCUMENTS

EP         1174835 A2 *    1/2002

*Primary Examiner*—Davetta W. Goins
*Assistant Examiner*—Kerri McNally
(74) *Attorney, Agent, or Firm*—Robert M. Downey, PA

(57) ABSTRACT

A device for locating a parked vehicle has a remote mobile unit with an aerodynamic housing, including a base and a transparent lens covering an illuminating visual indicator, such as a strobe light. The base contains a battery power source, an electronic sound emitter and control circuitry, including a radio signal transceiver and a spread spectrum processor. An adhesive membrane layer on the bottom of the base facilitates quick and easy attachment to a vehicle, at a location which is easily visible from a distance (e.g. the roof or other high exterior position). A wireless handheld control unit has an internal I/O processor, pushbuttons for entering commands, a spread spectrum processor and a radio transceiver and antenna for sending and receiving spread spectrum signals to and from the transceiver in the mobile unit in order to selectively activate and deactivate the illuminating visual indicator and sound emitter. The distinct emitted sound and flash sequence and/or rhythm of the illuminating indicator can be selectively programmed and/or changed by the user with the wireless handheld unit. The sound emitter and illuminating indicator have a respective audible and visual range of at least 1,000 feet.

17 Claims, 6 Drawing Sheets

U.S. PATENT DOCUMENTS

2004/0130447 A1* 7/2004 Monck .................. 340/539.32
2004/0164861 A1* 8/2004 Rawson ................. 340/539.32
2004/0217848 A1* 11/2004 Cheng .................... 340/425.5
2005/0094825 A1* 5/2005 Loness et al. ................ 381/82
2005/0126838 A1* 6/2005 Vaughan ..................... 180/167
2005/0261816 A1* 11/2005 DiCroce et al. .............. 701/36
2006/0187011 A1* 8/2006 van der Meer et al. ..... 340/438

* cited by examiner

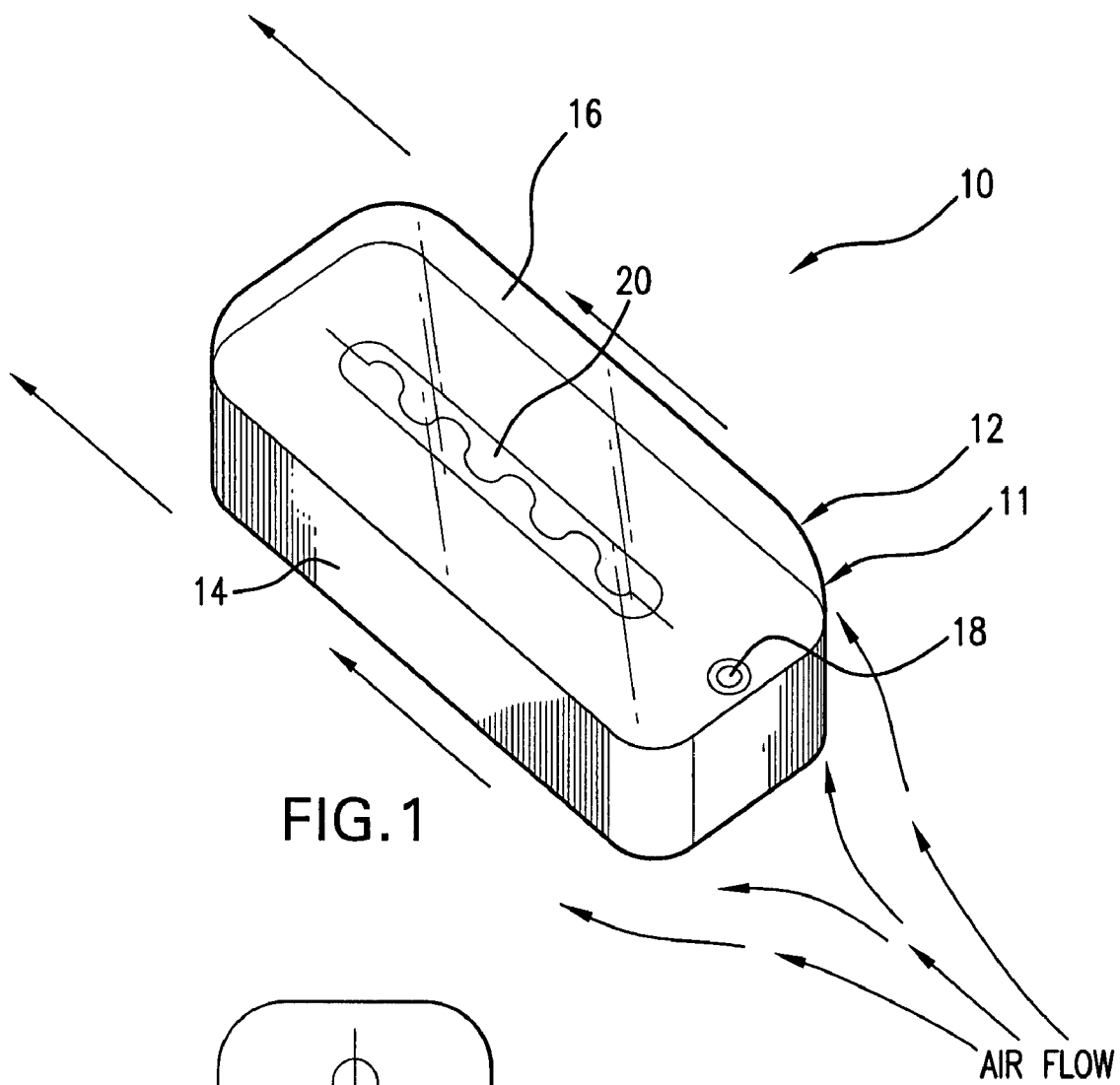
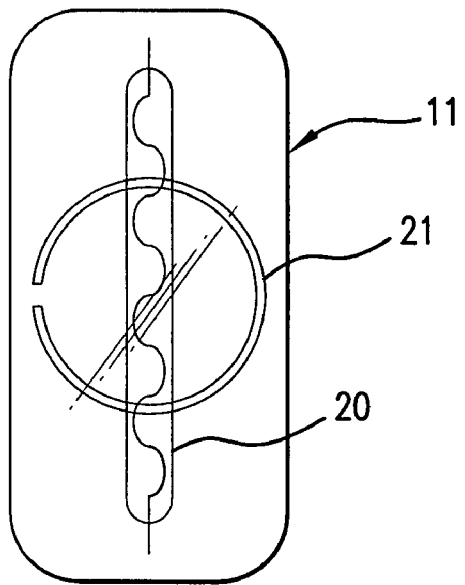

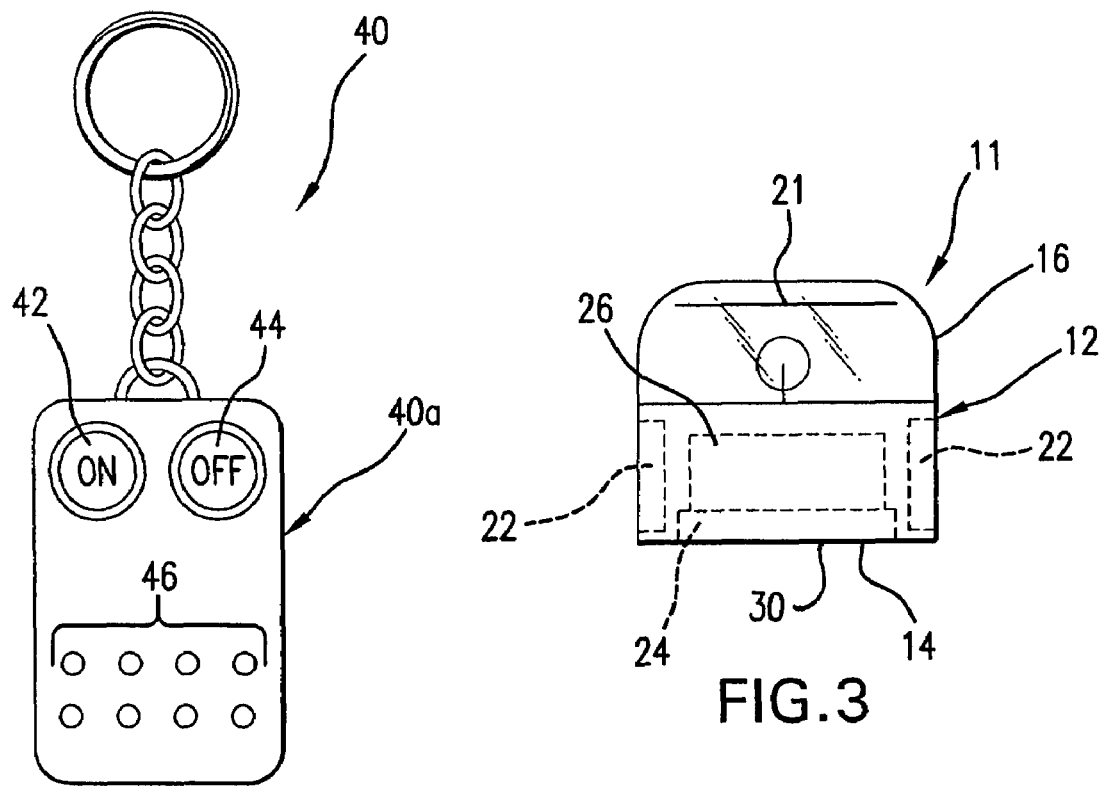
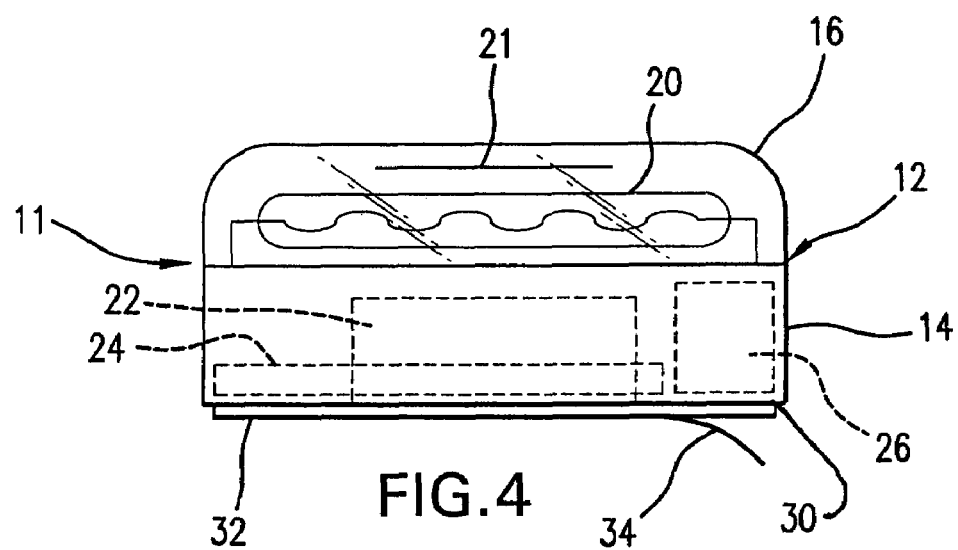

VEHICLE LOCATOR DEVICE

This application claims priority from U.S. Provisional Application No. 60/616,581 entitled Vehicle Locator Device, filed on Oct. 5, 2004.

BACKGROUND OF THE INVENTION

1. Field of the Invention

The present invention relates generally to devices that aid in the location of an automobile parked in a large and/or crowded parking lot or garage. More particularly, the present invention relates to a device for aiding in finding the location of a parked automobile with the combined usage of both a distinct illuminating visual indicator and a district audible indicator detectable from a range of at least 1,000 feet, and wherein both the illuminating indicator and audible indicator can be selectively changed to provide user specific visual and audible signals detectable during daylight and nighttime hours.

2. Discussion of the Related Art

When parked in a large or unfamiliar parking facility, such as a shopping mall, airport, supermarket or stadium, people often have difficulty finding their parking location upon return to their vehicle. In some instances, this may be a result of other parked vehicles hiding or obstructing the view of the person's automobile. Other times, people just simply forget where they parked their car. Whatever the reason, when people lose their vehicle in a parking facility, they are left to wander about the lot or garage in search of their automobile. This problem is not only of great inconvenience to drivers but, more importantly presents a significant security concern, particularly for women and elderly persons. The relevant art is crowded with various devices for helping people locate their parked vehicle. For instance, a variety of visual aid devices, such as flags, colored balls, flowers and the like have been attached to antennae, or other structures on vehicles to assist drivers in locating their vehicle in a crowded parking lot. Others have proposed various illuminating devices to help identify a vehicle in a crowded parking facility. Additionally, vehicle alarm systems and other sound emitting devices have been used to assist automobile owners in finding their parked vehicle. Notwithstanding, these and other aids have been found to have limited success and fail to provide an adequate solution.

Accordingly, there remains an urgent need for a vehicle locator device which overcomes the problems which have yet to be solved by the various proposed devices in the art. Specifically, there remains a need for an improved automobile locating device which provides for both a distinct and user selectable visual indicator and audible indicator having a detectable range of at least one thousand feet.

OBJECTS AND ADVANTAGES OF THE INVENTION

In view of the shortcomings of the prior art, it is a primary object of the present invention to provide a vehicle locator device which provides a distinct visual illuminating identification signal in conjunction with a distinct audible signal, both of which are detectable from a distance of at least 1,000 feet, thereby allowing a vehicle owner to quickly identify and find their vehicle in a large, crowded parking facility in both daylight hours and at night.

It is a further object of the present invention to provide a vehicle locator device containing a flashing strobe light and an audible sound emitting device contained within a housing which is easily installed on a vehicle for long term use.

It is still a further object of the present invention to provide a vehicle locator device which provides an aerodynamic housing containing both a flashing strobe light and a sound emitting device, and wherein the aerodynamic housing is adapted for quick and easy attachment to a vehicle with the use of a double sided adhesive membrane layer (e.g. tape) that will adhere to most metallic and glass surfaces and which is adapted to withstand the rigorous demands of exterior elements (i.e. wind, rain, heat and freezing temperatures), as well as wind forces when the vehicle is traveling at higher speeds.

It is yet a further object of the present invention to provide a vehicle locator device which provides for both a distinct visual illuminating signal and an audible signal, and wherein both the illuminating visual signal and audible signal can be selectively changed by the user.

It is yet a further object of the present invention to provide a vehicle locator device which includes a remote mobile unit that mounts to a vehicle and a rechargeable handheld unit for controlling operational functions of the remote mobile unit including operation of a flashing strobe light and a sound emitting device, and wherein both the handheld unit and remote mobile unit include a transceiver for bi-directional communication.

It is still a further object of the present invention to provide a vehicle locator device as set forth above, and wherein the bi-directional communication between the handheld unit and the remote mobile unit uses spread spectrum RF signal transmission to reduce signal interference and to provide resistance to jamming or corruption by other signal sources.

It is still a further object of the present invention to provide a vehicle locator device which includes a handheld wireless control unit and a remote mobile unit that mounts to a vehicle, and wherein the remote mobile unit is capable of storing and playing various audio indicators, similar to ringtones on a cellular phone.

It is still a further object of the present invention to provide a vehicle locator device as set forth above, and wherein the remote mobile unit includes a flashing strobe light which can be programmed to flash synchronously with audio sounds emitted from a sound emitting device in the remote mobile unit.

It is still a further object of the present invention to provide a vehicle locator device which provides for both a distinct visual illuminating signal and a distinct audible signal, and wherein both the visual signal and audible signal are detectable from a distance of at least 1,000 feet, and furthermore wherein the visual and audible signals are activated and deactivated with the use of a handheld wireless remote device.

It is still a further object of the present invention to provide a vehicle locator device which provides for both a distinct visual illuminating signal (e.g. a flashing strobe light) and a distinct audible signal, and wherein the visual illuminating signal is visible from 360 degrees around the vehicle and at a distance of at least 1,000 feet, and furthermore wherein the audible signal is audible at a range of at least 1,000 feet.

It is still a further object of the present invention to provide a vehicle locator device which provides for both a distinct illuminating signal and a distinct audible signal, and wherein the device is easy to operate with the use of a push button, handheld wireless remote device, and further wherein the wireless remote device provides for push button controls to selectively change the illuminating signal and the audible signal.

These and other objects and advantages of the present invention are more readily apparent with reference to the detailed description and accompanying drawings.

SUMMARY OF THE INVENTION

The present invention is directed to a device which aids in the location of a parked vehicle. The device includes a remote mobile unit that has both a visual and an audible identifier housed in an aerodynamic unit which is adapted for quick and easy attachment to an uppermost height of the vehicle roof, so as to enable visual identification in conjunction with an audible sound, both of which are detectable from a distance of at least one thousand feet. The initial triggering or activation of the audible and visual identifiers is ideally achieved with the use of a handheld wireless transmitting and receiving device. This wireless transceiver device also has means to facilitate programming and changing of the sound and the rhythm and flash sequence of the light signal (e.g. flashing strobe light) according to many user selectable combinations. The handheld transceiver device includes an arrangement of buttons, providing a user interface, for entering programming and activation commands to both the handheld unit and the remote mobile unit. The entered commands are made by button pressing sequences that are interpreted by an I/O processor within the handheld unit. Both the handheld unit and the remote mobile unit include a transceiver for bi-directional communication via spread spectrum radio frequency transmission. The handheld unit includes a USB port connection to allow a cable to be connected between the handheld unit and a personal computer for data transfer and/or battery recharging. The battery in the handheld unit may be recharged via a number of means including, but not limited to, a wall plug-in charger, and inductively coupled charger, a solar charger, or the USB connection to a personal computer.

The housing is aerodynamic to allow flow of air around the unit when the vehicle is traveling at high speeds (i.e. in excess of 60 mph). This allows the vehicle locator device to remain attached to the roof of the vehicle for long-term use. In a preferred embodiment, an adhesive membrane layer on the bottom of the housing of the device (e.g. double sided tape) is used to facilitate quick and easy attachment to the roof or other location (preferably at a high point) on the vehicle. The housing of the device is designed to be weatherproof to withstand extreme outdoor weather conditions such as freezing temperatures, ice, snow, and wind.

In a preferred embodiment, the housing of the remote mobile unit includes a base portion and a transparent lens cover which permits 360 degree visibility of the illuminating device (e.g. flashing strobe light). The base portion contains a battery power source, an electronic sound emitter and control circuitry, including a transceiver. The transceiver is adapted to send and receive the spread spectrum RF wireless signals for bi-directional communication with the handheld unit. The signal receiver communicates with the control circuitry to facilitate activation and deactivation of both the illuminating indicator and sound emitting device. Additionally, the transceiver in the remote mobile unit is adapted to receive signals from the handheld unit for selectively programming and changing the sounds emitted from the sound emitting device, as well as the rhythm and flash sequence of the illuminating indicator. In one preferred embodiment the remote mobile unit is capable of storing and playing various audio indicators, similar to ringtones on a cellular phone, as well as music and/or various other sounds. The various audio indicators are downloaded to the remote mobile unit via the spread spectrum bi-directional RF link between the handheld unit and the remote mobile unit. The handheld unit connects to a personal computer via the USB cable, enabling ring-tone patterns, music and other sounds to be downloaded from the Internet, to the personal computer, and subsequently downloaded to the handheld unit for wireless RF transmission and storage on the remote mobile unit internal processor. Similarly, the illuminating indicator can be programmed to display synchronously with the sound pattern. This can be achieved in several ways. For instance a sound amplitude detector in the remote mobile unit can be used to control flash of the strobe light in phase with the sound pattern. A second and preferable way to control the flash pattern is to download the light flash patterns at the same time the audio tones are downloaded onto the handheld unit. This is accomplished through the use of software on the personal computer which is able to analyze the sound and recommend a light pattern to match the sound pattern.

BRIEF DESCRIPTION OF THE DRAWINGS

For a fuller understanding of the nature of the present invention, reference should be made to the following detailed description taken in conjunction with the accompanying drawings in which:

FIG. 1 is a top front perspective view of the vehicle locator device housing, in accordance with one embodiment, illustrating air flow about the aerodynamic shaped housing;

FIG. 2 is a top plan view of the device of FIG. 1;

FIG. 3 is a front elevational view of the device of FIG. 1;

FIG. 4 is a side elevational view, in cross-section, showing the arrangement of the internal components of the device, within the housing, including a strobe light within the upper portion of the housing, a control circuitry and a battery power source in the lower portion of the housing;

FIG. 5 is a top plan view of a wireless remote transmitting device for controlling activation of the audible and visual indicators of the vehicle locator device according to one embodiment of the invention;

Like reference numerals refer to like parts throughout the several views of the drawings.

DETAILED DESCRIPTION OF THE PREFERRED EMBODIMENTS

Figure 6:
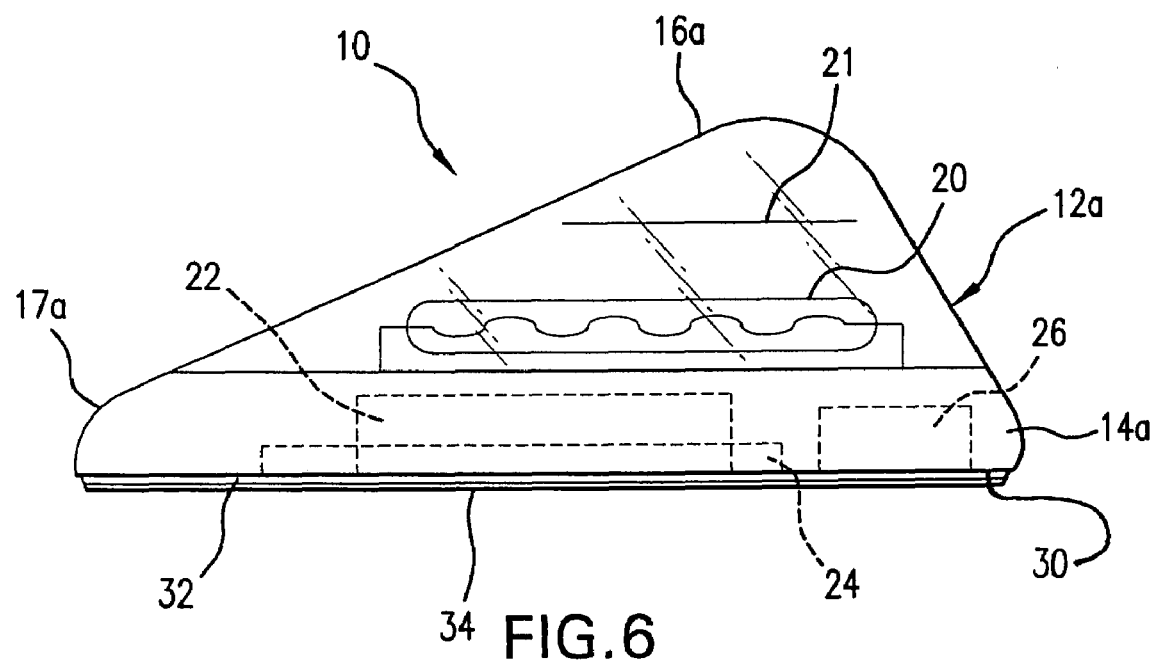
FIG. 6 is a side elevational view of a preferred embodiment of the aerodynamic shaped housing of the device of the present invention.

Referring to the several views of the drawings, the vehicle locator device is shown in accordance with various embodiments thereof and is generally indicated as 10. In each of the several embodiments of the invention, the vehicle locator device 10 includes a remote mobile unit (RMU) 11 and a wireless handheld unit (HHU) 40.

Referring initially to FIGS. 1-4, one embodiment of the remote mobile unit (RMU) is shown and includes a housing 12 with a base 14 and a lens cover 16. The base 14 is formed of an opaque molded plastic or like material and houses the electronic components of the device. The lens cover 16 is formed of a transparent moldable material which is UV resistant and adapted to withstand the harsh weather elements. The transparent lens cover 16 attaches to the base with two screws 18, one at each end (see FIG. 2). Attachment of the lens cover 16 to the base 14 provides a sealed enclosure to prevent penetration of water and moisture within the housing 12. A seal, such as a rubber gasket, may be provided about the lower edge of the lens cover 16 to provide sealed, watertight attachment between the lens cover 16 and the base 14.

An electric lamp 20 is maintained within the upper portion of the housing and emits light which is visible through the transparent lens cover 16 about 360 degrees. In a preferred embodiment, the electric lamp 20 is a strobe light which is adapted to flash according to a predetermined sequence and rhythm, emitting a bright light which is visible at a range of at least 1,000 feet from the device, and in all directions. A horizontal radio loop antenna 21 is supported within the upper portion for RF signal transmission and receipt. Directional signal strength attributes may optionally attach to the antenna function, allowing the user to determine the direction from the handheld unit 40 to the RMU.

The base 14 of the RMU housing contains a sound emitting device 22, a control circuit board 24 and a battery power source 26. Both the illuminating electric lamp 20 (e.g. strobe light) and the sound emitting device 22 are electrically connected to the control circuit board 24. The control circuit board 24 controls delivery of power from the battery power source 26 to both the illuminating electric lamp 20 and the sound emitting device 22. The sound emitting device is adapted to emit sound signals at decibel levels which are audible at a distance of at least 1,000 feet from the device. The control circuit board 24 controls the flash sequence and/or rhythm of the illuminating bulb 20 as well as the pitch, rhythm and other sound characteristics of the sound emitted from the sound emitting device 22.

Figure 10:
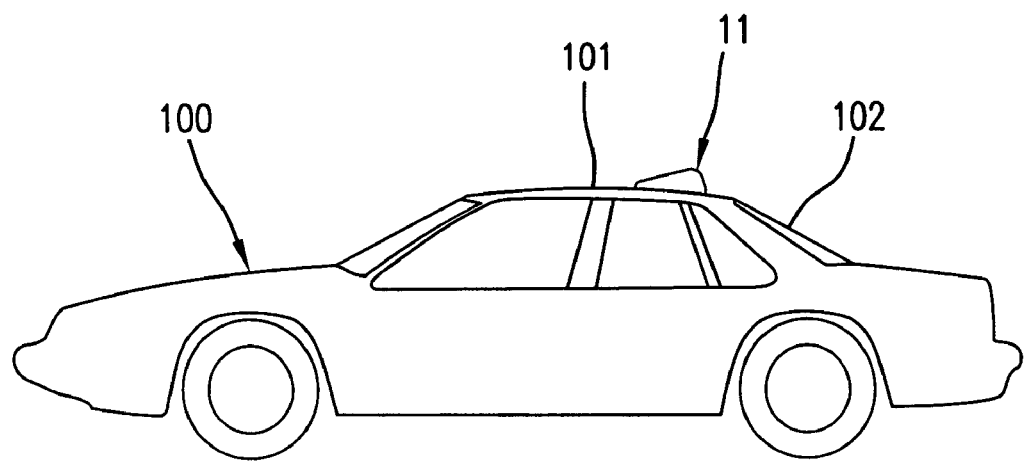
FIG. 10 is a side elevational view of an automobile showing the remote mobile unit in a preferred mounting location on the rear roof of the automobile.

The housing 12 is adapted for quick and easy attachment to a vehicle at a location on the vehicle which is easily visible from distances in excess of 1,000 feet. Preferably, the housing 12 is attached to the roof of the vehicle, which may be a metallic surface or a glass surface (e.g. a sunroof). Alternatively, the housing may be attached to another location, preferably on an exterior of the vehicle and at a high point to allow best visibility from a distance. FIG. 10 illustrates one preferred mounting location of the RMU 11 on the roof of the vehicle 100. In each of the various embodiments, the RMU 11 is provided with a double-sided adhesive membrane 32 on the bottom 30 of the housing 12 to facilitate quick attachment for long term use. Upon installation, a protective film 34 is peeled from the adhesive membrane 32 to expose an adhesive surface which meets against the attachment surface of the vehicle (i.e. roof surface). It is noted that the adhesive membrane material 32 is of a durable nature and intended for outdoor use to withstand the rigorous and extreme elements such as wind, rain, heat and freezing temperatures. The adhesive attachment is also sufficiently strong to prevent dislodging of the housing from attachment to the roof surface of the automobile when subjected to wind forces resulting from the vehicle traveling at higher rates of speed (i.e. in excess of 60 mph). As seen throughout the several views of the drawings, each of the embodiments of the housing of the device is provided with an aerodynamic configuration to promote air flow around the housing with minimal resistance.

Referring to FIG. 5, one embodiment of, a wireless handheld remote control unit (HHU) 40 is shown and is specifically identified as 40a. The HHU 40a is adapted to be carried on an existing key chain, or, alternatively, may provide a new key chain for use by the vehicle owner to carry the vehicle's keys. The wireless HHU 40a includes "ON" and "OFF" pushbuttons 42, 44, respectively, for controlling activation and deactivation of both the strobe light 20 and the sound emitting device 22. More specifically, the wireless HHU 40a acts as a transmitter which, upon depressing either the "ON" or "OFF" button, sends a control signal to a receiver carried on the control circuit board 24 within the housing of the device 10. Upon receipt of the control command signal, the control circuit board 24 controls activation and deactivation of both the strobe light 20 and the sound emitting device 22. The signals sent by the transmitter of the wireless HHU 40a have a range of at least 1,000 feet. Upon depressing the "ON" button 42 on the HHU 40a, both the strobe light 20 and the sound emitting device 22 are activated. Pressing the "OFF" button 44 immediately deactivates both the flashing strobe light 20 and the sound emitting device 22. Other push button controls 46 are provided on the HHU 40a for selectively changing the flash sequence and rhythm of the strobe light 20, as well as the sound characteristics emitted from the sound emitting device 22. This enables the user to select a distinctive light and sound combination which distinguishes the user's automobile from other automobiles in a large and/or crowded parking facility where owners of other parked vehicles may be using the same device. It is further noted that the signals emitted from the wireless HHU 40a may be coded, as selected by the user, to allow the receiver on the control circuit board 24 within the housing of the device to distinguish and differentiate from other control devices of other users in the same vicinity of the device 10. This helps to prevent activation of several RMUs which may be in the same area (i.e. within 1,000 feet) of the user's RMU.

Figure 7:
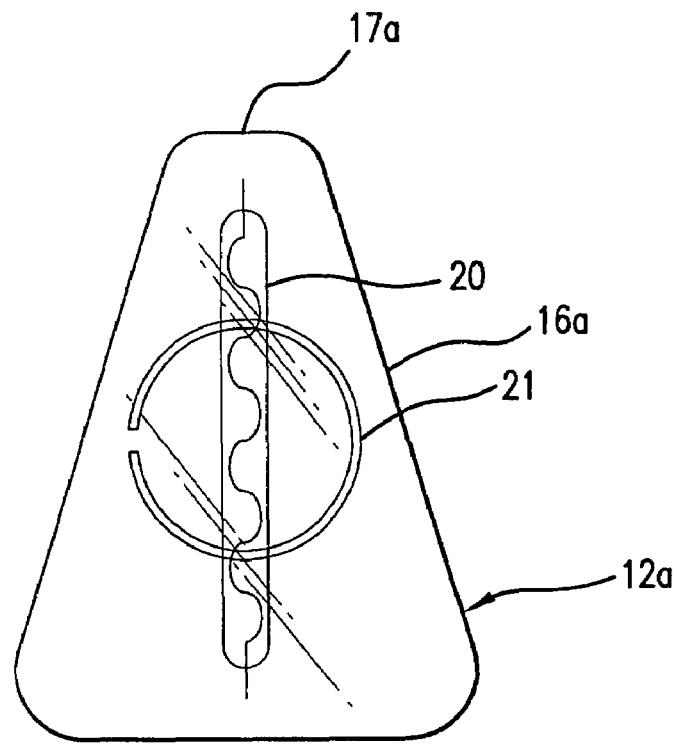
FIG. 7 is a top plan view of the housing of FIG. 6.

Referring to FIGS. 6 and 7, a preferred embodiment of the aerodynamic shaped housing of the RMU 11 is shown and is indicated as 12a. The aerodynamic housing 12a is formed in a generally triangular configuration and is secured to the roof of the vehicle so that the forward nose 17a of the housing is pointed towards the front of the vehicle. The base 14a and transparent lens cover 16a are congruently configured to provide a smooth and uninterrupted aerodynamic configuration, as seen in FIG. 6. In this embodiment (FIGS. 6 and 7), the internal components are the same as in the previously described embodiment of the RMU in FIGS. 1-4.

FIG. 10 illustrates an example of the mounting location of the RMU 11 on an automobile 100. Ideally the RMU 11 should be mounted on an exterior of the automobile 100 at the highest possible position to facilitate visibility at a substantial distance (at least 1000 feet away) in a crowded parking facility where other large vehicles, such as trucks, may be parked directly next to the automobile 100. As seen in FIG. 10, an ideal location for the RMU 11 is on the rear roof 101, just forward of the rear window 102.

Figures 8, 9:
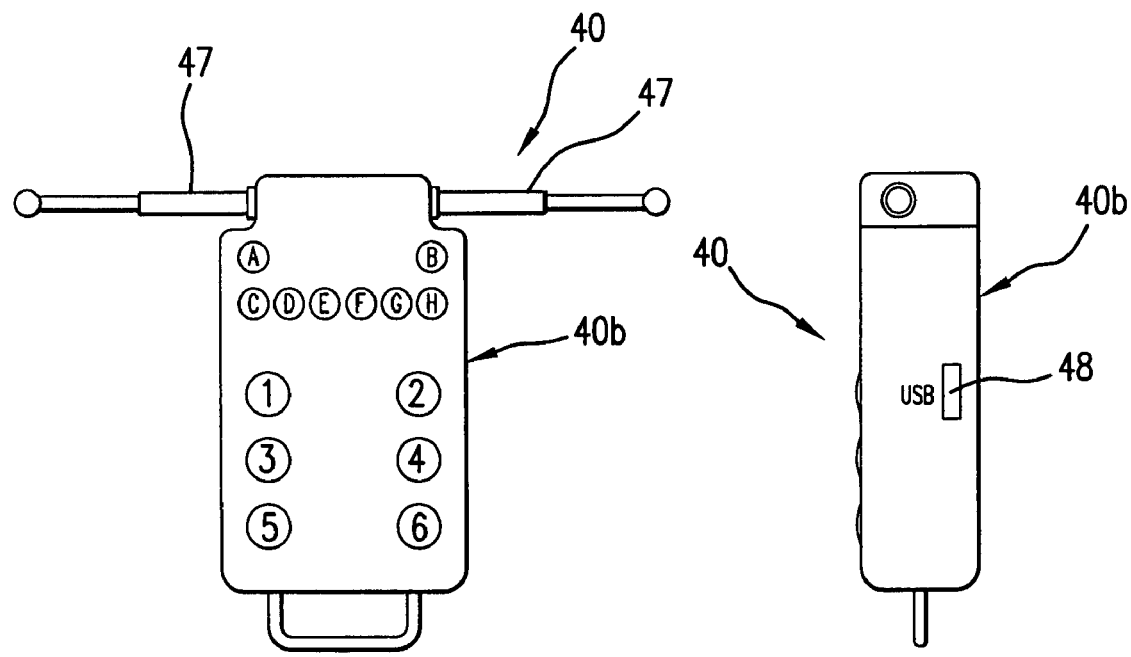
FIG. 8 is a top plan view of a wireless handheld remote control unit in accordance with a preferred embodiment of the invention.
FIG. 9 is a side elevational view of the handheld remote control unit of FIG. 8.

FIGS. 8 and 9 illustrate a preferred embodiment of the handheld control unit (HHU) 40, wherein the HHU is specifically identified as 40b. As seen in FIG. 8, the HHU 40b is provided with control push buttons (1-6) providing a user interface for entry of commands, including programming commands and operational commands. Programming and operational commands to the HHU 40b and to the RMU 11 are made by button pressing sequences that are interpreted by an internal processor within the HHU. The HHU 40b further includes an arrangement of LED indicators (labeled A-H) providing functional indications such as power ON, RMU contacted and acknowledgement received, and signal strength, based on the number of LED lamps illuminated, as a function of directional indication. In other words, as the user holding the HHU 40b gets closer to the RMU 11 on the user's automobile, more LED lamps become illuminated. In additional indicator in the form of an optional audible sound may be offered as a feature. This would allow warning of an event happening at the RMU, such as an attempted burglary or theft of the automobile, by providing a warning signal on the HHU to warn or inform the automobile owner holding the HHU at a remote location. As seen in FIG. 8, the HHU 40b includes a pair of opposite antennas 47 which extend outwardly from sides of the housing of the HHU 40b in opposite directions, along the common plane. This antenna configuration provides for optimal signal receipt from the RMU as well as the directional indication. Referring to FIG. 9, the HHU 40b may further be provided with a USB connector port 48 to allow connection of a USB cable that is also connected to a personal computer or other data storage device for transferring data and/or battery power. Thus, the USB connection may be used for charging the batteries within the HHU 40b. Connecting the HHU personal computer via a USB cable enables tone patterns to be downloaded from the personal computer for storage on the HHU and subsequent transmission and storage on the RMU. For example, ringtone sound patterns, music, and other audio signals and/or sound patterns can be downloaded from the connected PC for storage on the HHU. These sound patterns can then be transferred to the RMU via the spread spectrum RF link between the HHU and the RMU. Similarly, distinct light patterns can be programmed on the RMU to control operation of the light or illuminating indicator 20 to display a light pattern that is synchronous with the sound pattern emitted by the sound emitter device 22. This can be done in several ways. For instance, a sound amplitude detector in the RMU can control flash of the electric lamp 20 in phase with the sound pattern. A second and preferable way is to download the desired light patterns at the time the audio tones are downloaded. Software on the personal computer can analyze the sound patterns and recommend a matching light pattern.

As previously described, the HHU preferably includes an internal rechargeable battery power source 26. The HHU may be recharged via a number of means including, but not limited to, a wall plug-in charger, an inductively coupled charger, a solar charger, or the USB supply power from a personal computer USB port.

Figure 11:
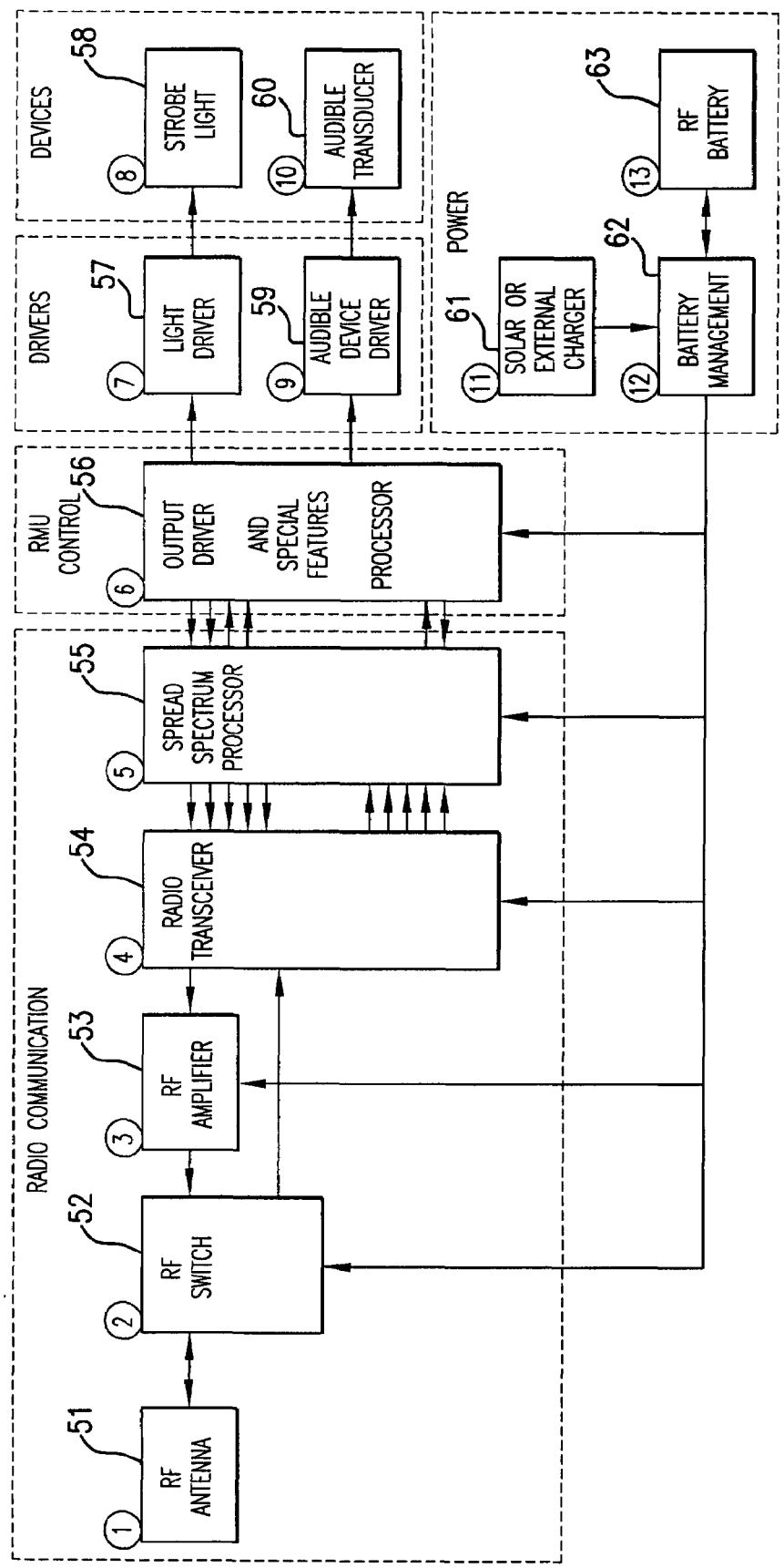
FIG. 11 is a schematic diagram of the remote mobile unit showing the principle components.

Referring to FIG. 11, a schematic of the RMU 11 is shown illustrating the principle components thereof, in accordance with a preferred embodiment. As shown, the RMU 11 includes an RF antenna 51 communicating with an RF switch. The antenna 51 is preferably of a horizontal plane loop. However, an optional vertical wire whip is contemplated. Directional signal strength attributes may optionally attach to the antenna function, allowing the user to determine the direction from the HHU to the RMU 11. The RF switch 52 allows the antenna to be used in both receive and transmit modes, or half duplex radio operation while using a separate RF amplifier 53. The amplifier 53 allows proper transmit signal strength for spread spectrum frequency hopping. The amplifier 53 raises the transmit power level to approximately +30 dbm. This allows the distance for reliable communications in worst-case environments to exceed the 1000 foot minimum range. A radio transceiver 54 provides for half duplex operation and is optimally suited to work with the spread spectrum processor 55 for spread spectrum operation. In a preferred embodiment, the radio transceiver 54 is a TEXAS INSTRUMENTS TRF6903. The spread spectrum processor 55 assures that signal integrity between the HHU 40b and the RMU 11. The spread spectrum processor 55 prevents conflict with multiple HHUs attempting to communicate with multiple RMUs at the same time, such in a case of a crowded area where a large number of user's cause the system have parked their cars. In a preferred embodiment, the spread spectrum processor 55 is a TEXAS INSTRUMENTS DOLPHIN DBB03 APPLICATION SPECIFIC INTERGRATED CIRCUIT (ASIC). An output driver and special features processor 56 provides an interface with the control data from the radio path and performs several functions. Specifically, the output driver and special feature processor 56 operates control of the light driver 57 and audible device driver 59. Moreover, the output driver and special features processor 56 is adapted for receipt and storage of special data audio sound waveforms in its flash memory for use and output of PWM for customized sound and synchronized light signal effects. The RMU battery status and other RMU status indications may be processed and sent to the HHU.

The light driver 57 is a flashing strobe that connects energy to the flashing strobe light 58. The light driver 57 consists of a high voltage generator and an enabling signal that initiates the bright flash of the strobe light 58. The strobe light 58 is preferably a xenon gas lamp. However, other technologies such as ultra bright LEDs may be used. The audible device driver 59 is a power amplifier that is driven by a pulse width modulated (PWM) signal. The audible transducer 60 is a flat profile loudspeaker with approximately 20 watts capacity and sound pressure of +90 dBA at 10 feet. Implementation may be with a flat profile moving voice coil and cone, or piezoelectric device. The solar for external charger 61 provides for normal charging of the battery 60 with the use of a grouping of solar cells placed on the horizontal surface of the RMU housing. The battery management 62 is a circuit that receives continual charging currents from the solar cells or from a charging connector. The voltages to the drivers are from the battery, and are nominally 12 volts. The voltages used by the other circuits within the RMU are derived from the battery and are regulated by switch mode or linear regulators. A low battery condition is available at the processor for sending status to the HHU. The battery 63 may be a 12 volt rechargeable type such as a TYSONIC 12V 1.2 AH.

Figure 12:
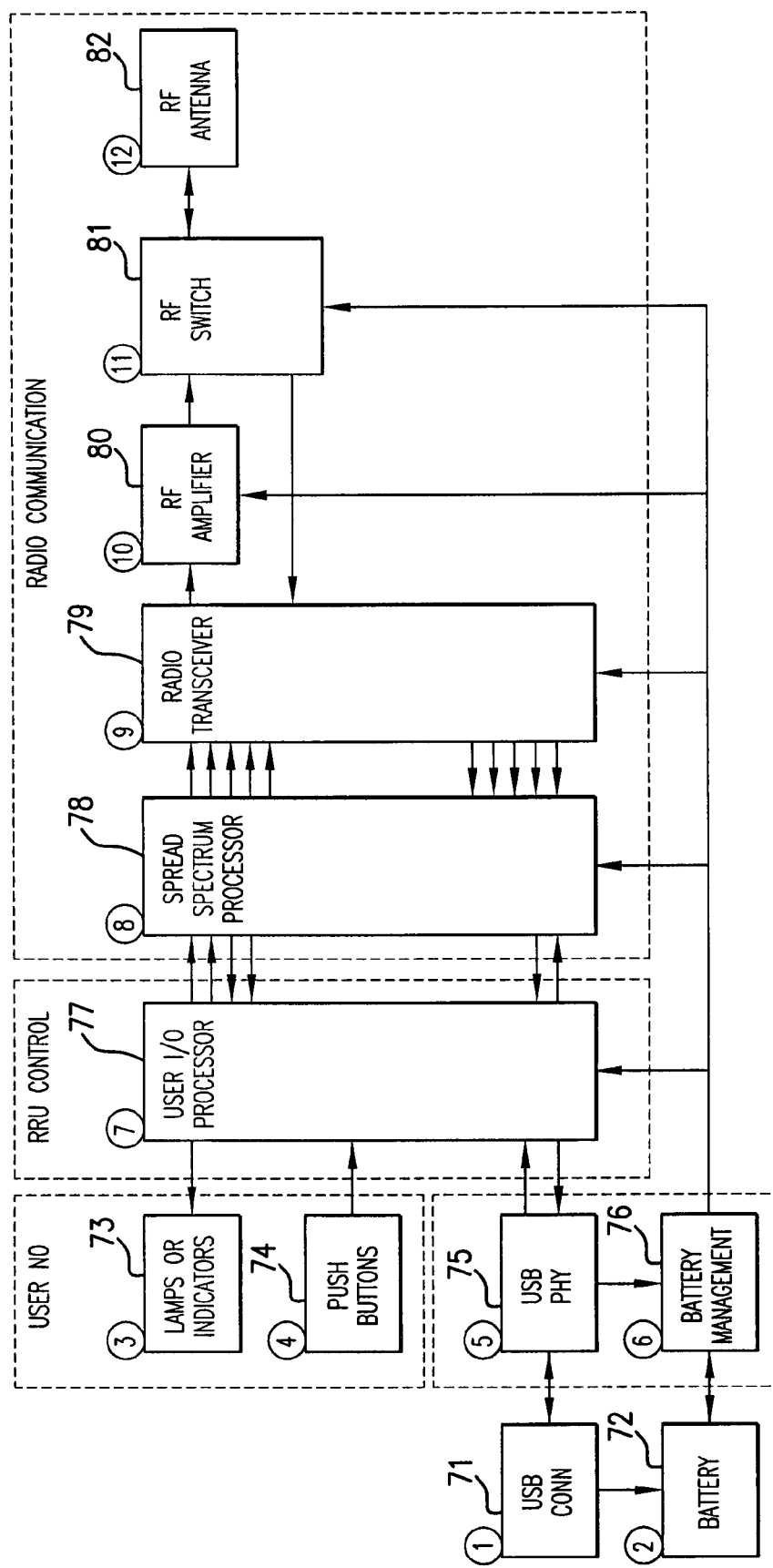
FIG. 12 is a schematic diagram of the wireless handheld control unit showing the principle components.

Referring to FIG. 12, a schematic diagram illustrates the principle components of the handheld unit in accordance with the preferred embodiment shown in FIGS. 8 and 9. The HHU 40b is provided with USB connector 71, as previously described. The battery 72 is either a fixed primary battery arrangement of small button cells or a rechargeable battery. Lamps or indictors 73 are preferably an arrangement of LEDs, as described in connection with FIG. 8. Push buttons 74, as also shown in FIG. 8, provide a user interface for entering programming and operational commands to the HHU 40b as well as the RMU 11. Command entries are made by pressing individual buttons in accordance to a predetermined sequence. The button pressing sequences are interpreted by the processor 77 to determine the command. USB PHY 75 is a physical boundary connection between the HHU 40b and a personal computer via a USB cable. The PHY protects the HHU and the personal computer from damage and allows clean signal integrity. Battery management 76 controls charging of the battery 72 and voltage regulation of the battery 72 to the electronics within the HHU 40b. User I/O processor 77 reads the button command entries and interprets their meaning, according to specific sequence of button pressing. The processor 77 activates the LED lamps on the HHU 40b to indicate status, and allows data through the USB port to be sent via the HHU to the RMU for the purpose of programming special sounds and light effects within the RMU. The I/O processor 77 may be a smaller internal version of the SMP430 with flash memory.

Spread spectrum processor 78 provides for spread spectrum radio transmission to assure signal integrity between the HHU 40b and the RMU 11. This helps to prevent a conflict with multiple HHUs attempting to communicate with multiple RMUs at the same time, such as in a crowded parking area where there are multiple users. In a preferred embodiment, the spread spectrum processor is a TEXAS INSTRUMENTS DOLPHIN DBB03 Application Specific Integrated Circuit (ASIC). Radio transceiver 79 provides half duplex operation. A TEXAS INSTRUMENTS TRF6903 radio transceiver is optimally suited to work with the TEXAS INSTRUMENTS DOLPHIN MSP430 DBB03 ASIC for spread spectrum operation. RF amplifier 80 allows for proper transmission of signal strength for spread spectrum frequency hopping. The RF amplifier 80 raises the transmit power level to approximate +30 dBm. This allows the distance for reliable communications in worst case environments to exceed the 1,000 foot minimum range. RF switch 81 allows the antenna 82 to be used in both receive and transmit modes, or half duplex radio operation while using a separate RF amplifier. RF antenna 82 may be implemented as a straight wire whip or as a dipole. Directional signal strength attributes may optionally attach to the antenna function, allowing the user to determine the direction from the HHU 40b to the RMU 11 location.

While the present invention has been shown and described in accordance with various preferred and practical embodiments thereof, it is recognized that departures from the instant disclosure are contemplated within the spirit and scope of the present invention as defined in the following claims and interpreted under the doctrine of equivalents.

What is claimed is:

1. A device for locating a parked motor vehicle, said device comprising:
    a mobile unit adapted to be mounted on the motor vehicle and including a base and a cover, and at least a portion of said cover being structured to permit outward transmission of visible light signals therefrom and allowing 360 degree directional visibility of the light signals entirely about the motor vehicle, and said mobile unit further comprising:
        an illuminating indicator for releasing the outward transmission of light signals up to a visible range of at least 1,000 feet;
        a sound emitter for emitting a user selected distinct audible sound pattern that has an audible range of at least 1,000 feet;
        a radio signal transceiver for sending and receiving radio frequency signals; and
        an internal power source for supplying electric power to said illuminating indicator, said sound emitter and said transceiver;
    a handheld control unit comprising:
        command entry controls for entering programming and operational commands;
        a radio signal transceiver for sending and receiving radio frequency signals and providing bi-directional radio frequency communication with said mobile unit via said radio signal transceiver in said mobile unit;
        an internal processor for reading the commands entered at said command entry controls and for directing transmission of radio frequency command signals from said transceiver of said handheld control unit to said mobile unit to control operation of said illuminating indicator and said sound emitter, and said internal processor being structured and disposed for programming and storing a plurality of distinct light signal patterns to be released by said illuminating indicator upon operation thereof and a plurality of distinct sound patterns to be emitted by said sound emitter upon operation thereof;
        said command entry controls being structured and disposed for selecting one or more of said plurality of distinct light signal patterns and for selecting one or more of said plurality of distinct sound patterns;
        said command entry controls being structured and disposed for allowing selective entry of said operational commands including operational commands for operating said illuminating indicator and said sound emitter, and user selected operational commands for selecting one or more of said plurality of distinct light signal patterns to be released by said illuminating indicator upon operation thereof and for selecting one or more of said plurality of distinct sound patterns to be emitted by said sound emitter upon operation thereof; and
        an internal power storage source for supplying electric power to said command entry controls, said radio signal transceiver and said internal processor.

2. The device as recited in claim 1 wherein said mobile unit further comprises:
    an internal processor communicating with said radio signal transceiver within said mobile unit, and said internal processor being structured an disposed to control operation of said illuminating indicator and said sound emitter.

3. The device as recited in claim 2 wherein said internal processor of said mobile unit is further structured and disposed to store the plurality of distinct light signal patterns and distinct sound patterns.

4. The device as recited in claim 3 wherein said internal processor of said mobile unit is further structured and disposed to monitor power level stored in said internal power source of said mobile unit and to command said radio signal transceiver to send data signals to said handheld control unit providing a status indication on the handheld control unit of the monitored power levels of said internal power source of said mobile unit.

5. The device as recited in claim 1 wherein said illuminating indicator is a strobe light.

6. The device as recited in claim 1 wherein said sound emitter comprises:
    an audible transducer; and
    an audible transducer driver.

7. The device as recited in claim 1 wherein said mobile unit further comprises:
    a radio frequency antenna.

8. The device as recited in claim 7 wherein said handheld control unit further comprises:
    a radio frequency antenna.

9. The device as recited in claim 1 wherein said radio frequency signals transmitted by the radio signal transceivers in said mobile unit and said handheld control unit are via spread spectrum radio transmission.

10. A device for locating a parked motor vehicle, said device comprising:
   a mobile unit adapted to be mounted on the motor vehicle and including a base and a cover, and at least a portion of said cover being structured to permit outward transmission of visible light signals therefrom and allowing 360 degree directional visibility of the light signals entirely about the motor vehicle, and said mobile unit further comprising:
      an illuminating indicator for releasing the outward transmission of light signals up to a visible range of at least 1,000 feet;
      a sound emitter for emitting a user selected distinct audible sound pattern that has an audible range of at least 1,000 feet;
      a radio signal transceiver for sending and receiving radio frequency signals;
      an internal processor communicating with said radio signal transceiver for controlling operation of said illuminating indicator and said sound emitter;
      a radio frequency antenna connected to said radio signal transceiver; and
      an internal power source for supplying electric power to said illuminating indicator, said sound emitter and said transceiver;
   a handheld control unit comprising:
      command entry controls for entering programming and operational commands;
      a radio signal transceiver for sending and receiving radio frequency signals and providing bi-directional radio frequency communication with said mobile unit via said radio signal transceiver in said mobile unit;
      an internal processor for reading the commands entered at said command entry controls and for directing transmission of radio frequency command signals from said transceiver of said handheld control unit to said mobile unit to control operation of said illuminating indicator and said sound emitter, and said internal processor being structured and disposed for programming and storing a plurality of distinct light signal patterns to be released by said illuminating indicator upon operation thereof and a plurality of distinct sound patterns to be emitted by said sound emitter upon operation thereof;
      said command entry controls being structured and disposed for selecting one or more of said plurality of distinct light signal patterns and for selecting one or more of said plurality of distinct sound patterns;
      said command entry controls being structured and disposed for allowing selective entry of said operational commands including operational commands for operating said illuminating indicator and said sound emitter, and user selected operational commands for selecting one or more of said plurality of distinct light signal patterns to be released by said illuminating indicator upon operation thereof and for selecting one or more of said plurality of distinct sound patterns to be emitted by said sound emitter upon operation thereof;
      a radio frequency antenna connected to said radio signal transceiver; and
      an internal power storage source for supplying electric power to said command entry control, said radio signal transceiver and said internal processor.

11. The device as recited in claim 10 wherein said internal processor of said mobile unit is further structured and disposed to store the plurality of distinct light signal patterns and distinct sound patterns.

12. The device as recited in claim 10 wherein said radio frequency signals transmitted by the radio signal transceivers in said mobile unit in said handheld control unit are via spread spectrum radio transmission.

13. The device as recited in claim 10 wherein said illuminated indicator is a strobe light.

14. The device as recited in claim 10 wherein said sound emitter comprises;
   an audible transducer; and
   an audible transducer driver.

15. A device for locating a parked motor vehicle, said device comprising:
   a mobile unit adapted to be mounted on the motor vehicle and including a base and a cover, and at least a portion of said cover being structured to permit outward transmission of visible light signals therefrom and allowing 360 degree directional visibility of the light signals entirely about the motor vehicle, and said mobile unit further comprising:
      an illuminating indicator for releasing the outward transmission of light signals up to a visible range of at least 1,000 feet;
      a sound emitter for emitting a user selected distinct audible sound pattern that has an audible range of at least 1,000 feet;
      a spread spectrum processor for processing spread spectrum radio frequency signals;
      a radio signal transceiver for sending and receiving spread spectrum radio frequency signals;
      an internal processor communicating with said radio signal transceiver for controlling operation of said illuminating indicator and said sound emitter;
      a radio frequency antenna connected to said radio signal transceiver; and
      an internal power source for supplying electric power to said illuminating indicator, said sound emitter, said spread spectrum processor, said internal processor and said transceiver;
   a handheld control unit comprising:
      command entry control for entering programming and operational commands;
      a spread spectrum processor for processing spread spectrum radio frequency signals;
      a radio signal transceiver for sending and receiving spread spectrum radio frequency signals and providing bi-directional spread spectrum radio frequency communication with said mobile unit via said radio signal transceiver in said mobile unit;
      an internal processor for reading the commands entered at said command entry control and for directing transmission of radio frequency command signals from said transceiver of said handheld control unit to said mobile unit to control operation of said illuminating indicator and said sound emitter, and said internal processor being structured and disposed for programming and storing a plurality of distinct light signal patterns to be released by said illuminating indicator upon operation thereof and a plurality of distinct sound patterns to be emitted by said sound emitter upon operation thereof;

said command entry controls being structured and disposed for selecting one or more of said plurality of distinct light signal patterns and for selecting one or more of said plurality of distinct sound patterns;

said command entry controls being structured and disposed for allowing selective entry of said operational commands including operational commands for operating said illuminating indicator and said sound emitter, and user selected operational commands for selecting one or more of said plurality of distinct light signal patterns to be released by said illuminating indicator upon operation thereof and for selecting one or more of said plurality of distinct sound patterns to be emitted by said sound emitter upon operation thereof;

a radio frequency antenna connected to said radio signal transceiver; and an internal power storage source for supplying electric power to said command entry controls, said spread spectrum processor, said radio signal transceiver and said internal processor.

16. The device as recited in claim 15 wherein said illuminating indicator is a strobe light.

17. The device as recited in claim 15 wherein said sound emitter comprises:

an audible transducer; and an audible transducer driver.

* * * * *